(12) United States Patent
Townley

(10) Patent No.: US 12,110,477 B2
(45) Date of Patent: Oct. 8, 2024

(54) INK AND STAIN REMOVAL

(71) Applicant: MIX 14 LTD., Abingdon (GB)

(72) Inventor: Gary Townley, Abingdon (GB)

(73) Assignee: MIX 14 LTD., Oxfordshire (GB)

( * ) Notice: Subject to any disclaimer, the term of this patent is extended or adjusted under 35 U.S.C. 154(b) by 721 days.

(21) Appl. No.: 17/278,013

(22) PCT Filed: Sep. 20, 2019

(86) PCT No.: PCT/GB2019/052651
§ 371 (c)(1),
(2) Date: Mar. 19, 2021

(87) PCT Pub. No.: WO2020/058727
PCT Pub. Date: Mar. 26, 2020

(65) Prior Publication Data
US 2021/0348084 A1    Nov. 11, 2021

(30) Foreign Application Priority Data
Sep. 20, 2018  (GB) ..................... 1815343

(51) Int. Cl.
*C11D 1/00* (2006.01)
*C11D 1/72* (2006.01)
(Continued)

(52) U.S. Cl.
CPC .............. *C11D 3/044* (2013.01); *C11D 1/721* (2013.01); *C11D 3/185* (2013.01); *C11D 3/2079* (2013.01); *C11D 3/30* (2013.01); *C11D 3/382* (2013.01); *C11D 3/43* (2013.01); *C11D 17/046* (2013.01); *C11D 2111/12* (2024.01)

(58) Field of Classification Search
CPC .. C11D 1/00; C11D 1/72; C11D 3/042; C11D 3/044; C11D 3/2079; C11D 3/26; C11D 3/30; C11D 3/50
See application file for complete search history.

(56) References Cited

U.S. PATENT DOCUMENTS

2014/0260466 A1* 9/2014 Rehage ................ C11D 7/5004
252/88.1

FOREIGN PATENT DOCUMENTS

CN    106479258 A    3/2017
EP    0648820 A2    4/1995
(Continued)

OTHER PUBLICATIONS

International Search Report and Written Opinion for corresponding Application No. PCT/GB2019/052651 (mailed Jan. 21, 2020).
(Continued)

*Primary Examiner* — Brian P Mruk
(74) *Attorney, Agent, or Firm* — Troutman Pepper Hamilton Sanders LLP (Rochester)

(57) ABSTRACT

A water-based stain removal formulation, comprising: a lye solution comprising an inorganic hydroxide base; an oil mixture comprising one or more surfactants, an orange extract and an organic base; and an acid mixture comprising acetic acid and a thickener. Methods of manufacture of a water-based stain removal formulation, use of a water-based stain removal formulation, and an applicator for a water-based stain removal formulation are also described.

17 Claims, 8 Drawing Sheets

(51) Int. Cl.
  *C11D 3/04* (2006.01)
  *C11D 3/18* (2006.01)
  *C11D 3/20* (2006.01)
  *C11D 3/26* (2006.01)
  *C11D 3/30* (2006.01)
  *C11D 3/382* (2006.01)
  *C11D 3/43* (2006.01)
  *C11D 3/50* (2006.01)
  *C11D 17/04* (2006.01)

(56) References Cited

FOREIGN PATENT DOCUMENTS

| EP | 2774961 A1 | 9/2014 |
| IN | 105733347 A | 6/2016 |
| WO | 94/18300 A2 | 8/1994 |
| WO | 99/42553 A1 | 8/1999 |
| WO | 02/079366 A1 | 10/2002 |
| WO | 2009/137096 A1 | 11/2009 |
| WO | 2013/141855 A1 | 9/2013 |

OTHER PUBLICATIONS

Great Britain Search Report for corresponding Application No. GB1815343.7 (mailed Oct. 31, 2018).

\* cited by examiner

INK AND STAIN REMOVAL

This application is a national stage application under 35 U.S.C. § 371 of PCT Application No. PCT/GB2019/052651, filed Sep. 20, 2019, which claims the benefit of Great Britain Patent Application No. 1815343.7, filed Sep. 20, 2018, which are hereby incorporated by reference in their entirety.

TECHNICAL FIELD

The present disclosure relates to the formulation and manufacture of a water-based ink and stain remover.

BACKGROUND

Removal of stains, in particular ink, from fabrics, can be problematic. This is exacerbated if the ink has dried or set. While many purported cleaning solutions exist for the removal of stains or ink they are frequently either ineffectual, or the strong chemicals used can damage the underlying fabric.

One option to remove stains or ink is to use non-solvent based cleaning solutions. However, these tend to be effective only if the stain or ink is treated within a very short period of time of occurring. Once the stain or ink has dried or set non-solvent based removers tend to be ineffective.

Another option is the use of solvent based systems. However, the solvents used in these systems can damage the underlying fabric or can remove colours or whiteners from the material as well as the ink or stain leading to a visible mark remaining after cleaning.

The need for effective stain or ink removers is most keenly felt in industrial, heavy use environments where staining is more frequent and the desire for quick, simple and inexpensive stain removal is of particular importance.

A particular industrial environment where there remains an acute need for effective stain removal from fabrics is in the aerospace industry. The legal requirements, particularly in relation to flammability, relating to the fabrics used in airplane interiors do not allow the fabric to be altered chemically, i.e. by use of paints or solvents, without subsequent re-testing to ensure flammability requirements are still met. This additional testing step is time consuming, costly and labour intensive.

Additional problems exist with solvent based systems such as incompatibility with materials such as leather, cottons and nylons, and their ability to damage surfaces if mishandled. Due to their efficacy solvent based systems are still the most popular option. Nevertheless, there remains a need for a novel, effective stain removal system that reduces the risk of damage to the fabric and does not leave any residual flammable solvents.

It is an aim of the present invention to address one or more of the disadvantages associated with the prior art.

SUMMARY OF INVENTION

In a first aspect, the invention provided a water-based stain removal formulation, comprising:
  a lye solution comprising an inorganic hydroxide base;
  an oil mixture comprising one or more surfactants, an orange extract (or an orange oil, or a solution comprising greater than 70 wt % D-limonene based on the total weight of the D-limonene solution, or D-limonene), and an organic base; and
  an acid mixture comprising acetic acid and a thickener.

In an embodiment, the lye solution comprises potassium hydroxide in water. Suitably, the lye solution comprises between 10 wt % to 50 wt % potassium hydroxide in water based on the total weight of the lye solution, more suitably 20 wt % potassium hydroxide in water, based on the total weight of the lye solution.

In an embodiment, the oil mixture comprises at least one of polyethylene glycol p-(1,1,3,3-tetramethylbutyl)-phenyl ether (Triton X-100®), orange extract comprising greater than 90 wt % D-limonene, polyethylene glycol-8 [(PEG-8)] and triethanolamine. In another embodiment. the acid mixture comprises at least one of glycerine and white vinegar, wherein white vinegar is 5 wt % to 20 wt % acetic acid in water, suitable, 5 wt % acetic acid in water, based on the total weight of the white vinegar solution.

In an embodiment, the lye solution comprises between 10 vol % and 70 vol % of the formulation, based on the total volume of the formulation.

In an embodiment, the formulation further comprises tea tree oil. Suitably, the tea tree oil is present in the range of from 1 wt % to 15 wt %, based on the total weight of the formulation.

In another embodiment, the pH of the formulation is approximately pH 7. In an embodiment, the formulation is biodegradable.

In a second aspect, the invention provides a method of preparing a water-based stain removal formulation, the method comprising the following steps:
  provide a lye solution comprising an inorganic hydroxide base, typically potassium hydroxide, in water;
  provide an oil mixture comprising one or more surfactants, an orange extract (or an orange oil, or a solution comprising greater than 70 wt % D-limonene based on the total weight of the D-limonene solution, or D-limonone) and an organic base;
  heat the oil mixture to a temperature in the range of from approximately 60° C. to approximately 70° C. to provide a heated oil mixture;
  combine the lye solution with the heated oil mixture;
  blend the combined mixture for a period of time, typically but not limited to, in the range of from approximately 15 minutes to approximately 1 hour whilst maintaining the combined mixture at a temperature of from approximately 60° C. to approximately 70° C. to provide a heated combined mixture;
  allow heated combined the mixture to cool to approximately 35° C. or below to provide a cooled combined mixture;
  combine an acid mixture comprising acetic acid, suitably white vinegar. and a thickener, typically glycerine with the cooled combined mixture to provide a combined neutral mixture having a pH of approximately pH 7; and
  stir the combined neutral mixture for a period of time, typically in the range of from 3 to 8 hours, to provide the formulation.

In an embodiment of the second aspect of the invention, the lye solution comprises potassium hydroxide in water. Suitably, the lye solution comprises 20 wt % potassium hydroxide in water, based on the total weight of the lye solution.

In embodiments the oil mixture comprises at least one of polyethylene glycol p-(1,1,3,3-tetramethylbutyl)-phenyl ether (Triton X-100®), orange extract comprising greater than 90 wt % D-limonene, polyethylene glycol-8 (PEG-8) and triethanolamine.

In an embodiment, the acid mixture comprises at least one of glycerine and white vinegar, wherein white vinegar is 5 wt % to 20 wt % acetic acid in water, suitable, 5 wt % acetic acid in water, based on the total weight of the white vinegar solution.

In an embodiment, the lye solution comprises between 10 vol % and 70 vol % of the formulation, based on the total volume of the formulation.

In an embodiment, the method further comprises adding tea tree oil wherein the formulation further comprises tea tree oil. Suitably, the tea tree oil is added in the range of from 1 wt % to 15 wt %, based on the total weight of the formulation.

In an embodiment, the amount of lye solution and acid mixture is adjusted such that the pH of the formulation is approximately pH 7.

In a third aspect, the invention provides a method of using the formulation of the first aspect, or a formulation prepared by the method of the second aspect, the method comprising the following steps:
- apply the formulation to a stain on a fabric such that the stained area is wetted;
- optionally allow a period of time of from approximately one minute to approximately one hour to pass;
- contact, or dab, the stained area of the fabric with an absorbent material to withdraw and retain the solubilised stain on the absorbent material;
- repeat as necessary.

In a fourth aspect, the invention provides a use of the formulation of any one of the first aspect of the invention, or a formulation prepared by the method of the second aspect, for the removal of stains. In an embodiment, the stains are ink stains.

In a fifth aspect, the invention provides a device, or applicator, for the application of the formulation of the first aspect, or a formulation prepared by the method of the second aspect, to a material comprising:
- a reservoir for containment of the formulation;
- an applicator;

wherein the applicator is in fluid communication with the reservoir and configured to allow distribution of formulation from the reservoir when the applicator is applied to a surface.

In an embodiment, the applicator is a roller ball applicator. Suitably, the roller ball is made of a non-metal material. More suitably, the roller ball is made of glass.

In an embodiment, the applicator of the fifth aspect contains the formulation of the first aspect in the reservoir or a formulation prepared by the method of the second aspect.

BRIEF DESCRIPTION OF THE DRAWINGS

One or more embodiments of the invention will now be described, by way of example only, with reference to the accompanying drawings, in which.

DETAILED DESCRIPTION

Figure 1:
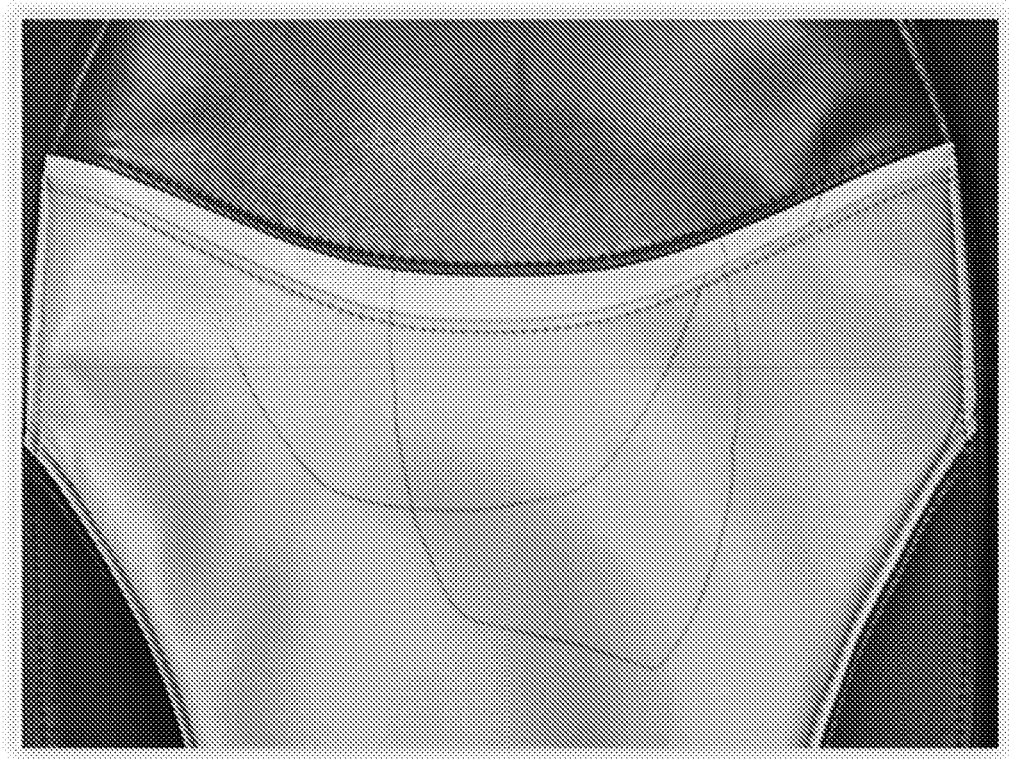
FIG. 1 shows a leather seat cover with a dried or set ink stain prior to stain removal treatment.
Figure 2:
FIG. 2 shows the leather seat cover as shown in FIG. 1 being treated with a stain removal formula in accordance with the present invention.
Figure 3:
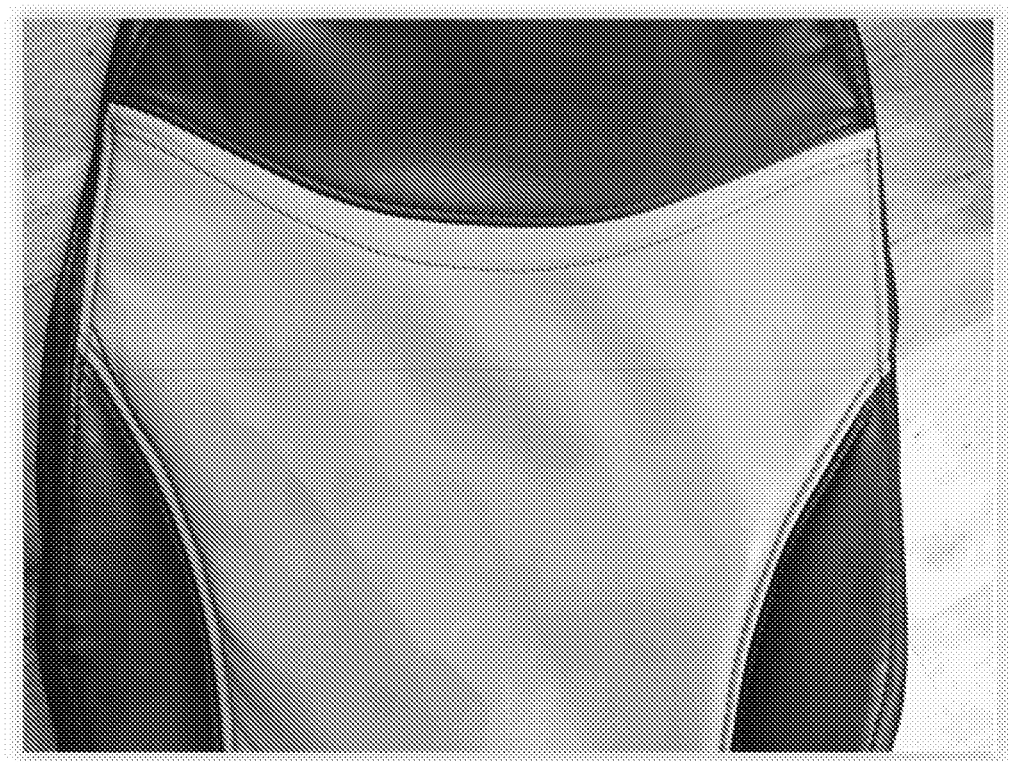
FIG. 3 shows the leather seat cover of FIGS. 1 and 2 after the application of the stain removal formula in accordance with the present invention. The stain is no longer present and no damage or negative degradation of the seat cover is evident post treatment.
Figure 4:
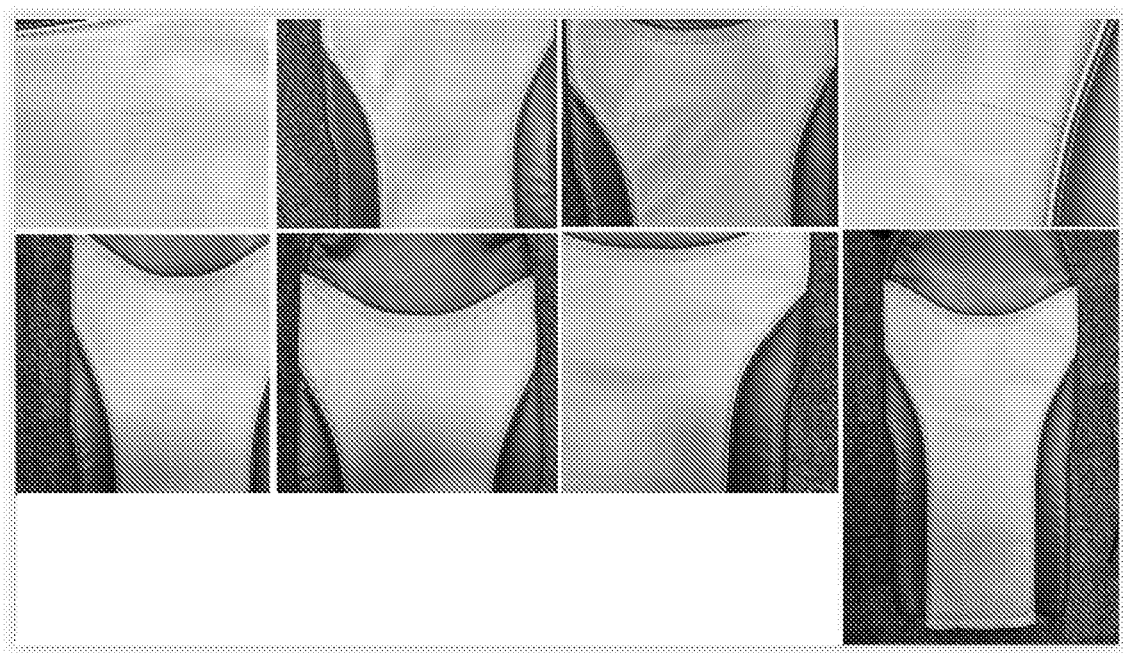
FIG. 4 shows a chronological series of images of two further leather seat covers with multiple and different levels of pigmentation before, during and after treatment with a stain removal formula in accordance with the present invention. Again, the ink stain is effectively removed from the cover without further treatment and no damage to the underlying material.
Figure 5A:
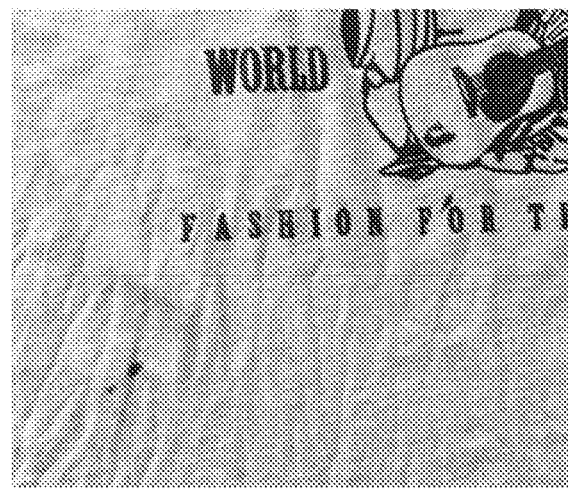
FIGS. 5a to 5e show a chronological series of images of a cotton fabric with two dried or set ink stains before, during and after treatment with a stain removal formula in accordance with the present invention. It is shown that on contact with the formula the ink is immediately solubilised, as evidenced by leaching onto the applicator, and the stain may be largely removed or diminished by contacting or dabbing with an absorbent material (FIG. 5d).
Figure 5B:
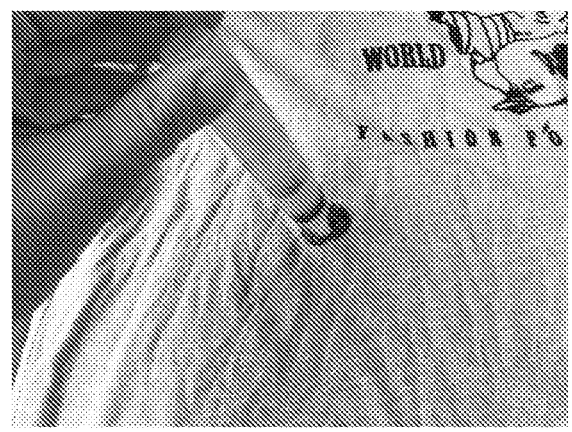
Figure 5C:
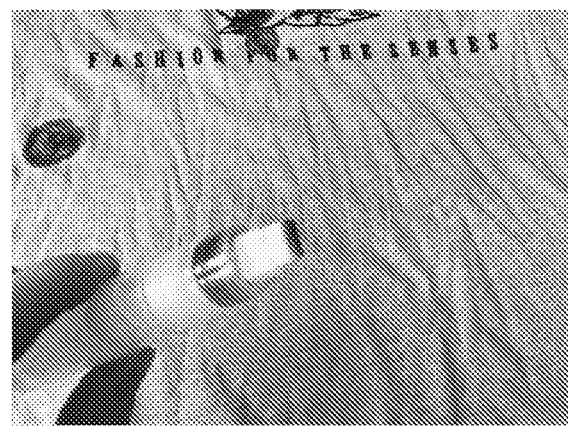
Figure 5D:
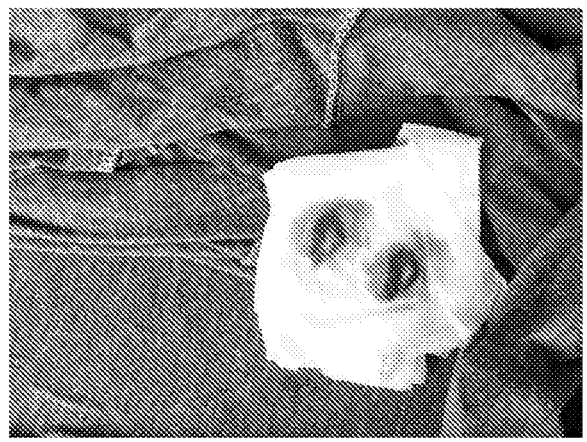
Figure 5E:
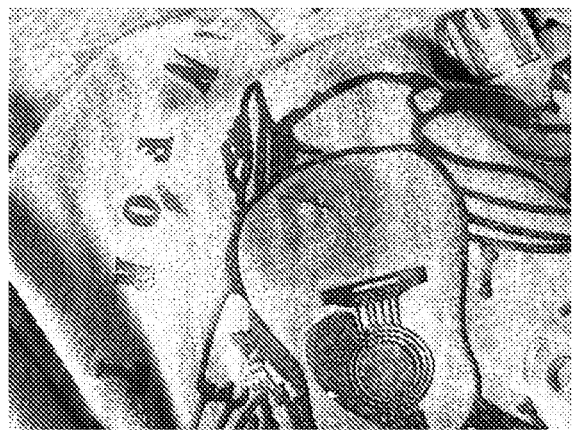
Figures 6A, 6B:
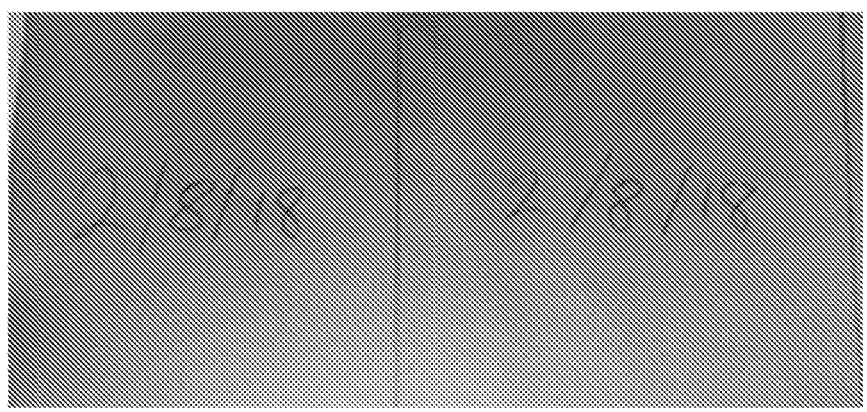
FIGS. 6a to 6e shows five identical samples of a synthetic leather material named "E-Leather®" formed from leather fibres and commercially available from the E-Leather Group® marked with ink from a Bic® roller ball pen.
Figures 6C, 6D, 6E:
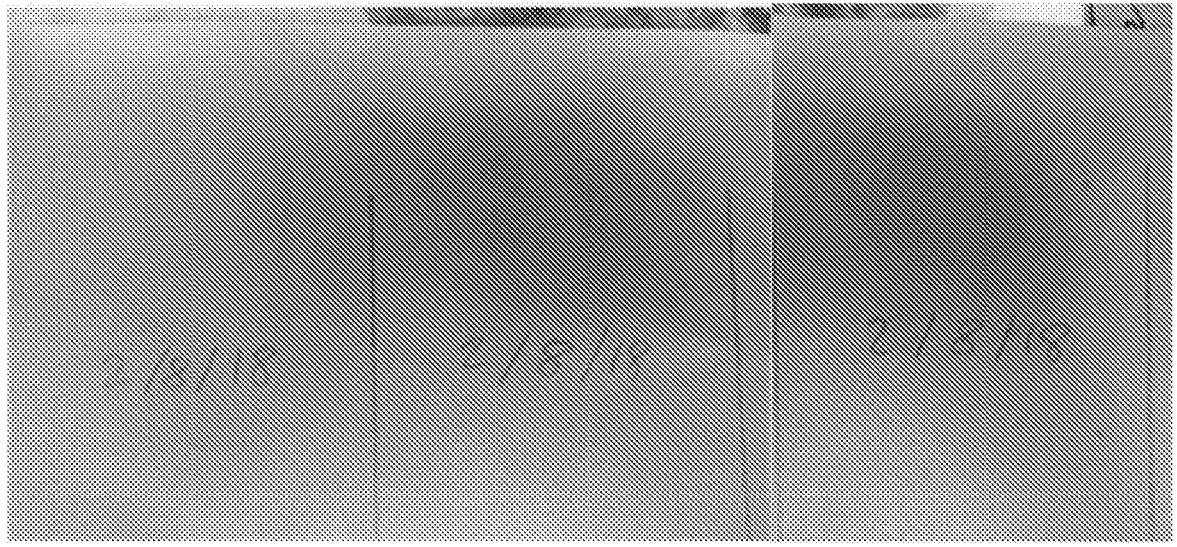

The invention generally relates to a formulation, method of manufacture and method of use of a water-based ink and/or stain remover. In an embodiment, the substantially pH neutral formulation comprises a mixture of surfactants, oils, natural acids, orange extract and a base.

For convenience, before further description of the present disclosure, certain terms employed in the specification, and examples are delineated here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles 'a', 'an' and 'the' are used to refer to one or to more than one (i.e. to at least one) of the grammatical object of the article.

As used herein, the term 'comprising' means any of the recited elements are necessarily included and other elements may optionally be included as well. 'Consisting essentially of' means any recited elements are necessarily included, elements which would materially affect the basic and novel characteristics of the listed elements are excluded, and other elements may optionally be included. 'Consisting of' means that all elements other than those listed are excluded. Embodiments defined by each of these terms are within the scope of this invention.

As used herein, the term 'lye' or 'lye solution' means a strong (high concentration) solution of an inorganic hydroxide, suitably the solution is an aqueous solution. Suitably the solution is greater than 10 wt % inorganic hydroxide in water, more suitably greater than 15 wt % or 18 wt % inorganic hydroxide in water. Suitably the inorganic hydroxide may be potassium hydroxide, lithium hydroxide or sodium hydroxide, more suitably potassium hydroxide.

As used herein, the term "biodegradable" means capable of being broken down in nature and/or by the action of living things. The term is used herein to refer to compositions, or components within compositions, that naturally break down to innocuous constituents in water or aqueous, or wet environments. The formulation may comply with EC Regulation No. 648/2004.

As used herein, the term 'non-hazardous' means not toxic or presenting a risk to people and animals, or the environment. In terms of chemical compounds, non-hazardous may mean complying with any one or more of EC Regulation No 1907/2006, EC Regulation No 1272/2008, REACH Directive 1999/45/EC, No 76/769/EEC, European Council Directive 793/93 and 91/155/EEC, 93/67/EEC or 67/548/EEC; or achieving a toxicity category IV (practically non-toxic and not an irritant) according to Title 40 of the United States Code of Federal Regulations (156.62), or equivalents thereof.

As used herein, the term 'orange oil' or 'orange extract' refers to an oil produced by cells within the rind of an orange fruit (*Citrus sinensis* fruit). It is typically composed of greater than 90 wt % D-limonene. As used herein the term 'orange oil' or 'orange extract' can mean the same, and may be used interchangeably to mean, purified or synthetic D-limonene. As it is a natural product, the compounds present in orange oil vary with different extractions as a result of regional and seasonal changes and the method used for extraction, therefore, it is assumed that any oil with a significant content, such as greater than 70 wt %, or greater than 80 wt % or greater than 90 wt % of D-limonene, or D-limonene itself would be interchangeable and such alternative solutions are encompassed by the present invention within the meaning of 'orange oil' or 'orange extract'.

As used herein, the term 'white vinegar' refers to a solution of acetic acid in water at a concentration of between 5 wt % and 20 wt % based on the total weight of the solution, suitably 5 wt % acetic acid in water based on the total weight of the solution.

It is known that pure or glacial acetic acid when exposed to temperatures lower than its melting point, for example 4° C., will solidify. In its solid state, glacial acetic acid it is a highly effective ink/stain remover and can be applied directly to stains typically using a rubbing motion. However, glacial acetic acid is also extremely caustic and hazardous with a pungent smell; the smell and melting in typical ambient conditions (around 18° C. to 25° C.) make it difficult to use. It is an advantage of the formulation of the present invention that it can be effective at ambient (or room) temperature or below without the negative effects associated with glacial acetic acid.

The formulation of the present invention contains only natural ingredients that are 100% biodegradable and can remove ink and other stains in fabrics even after they have dried or have 'set' with minimal or no surface damage to the fabric. This applies for natural woven and non-woven fabrics such as cotton and leather, synthetic fabrics such as nylon or E-Leather®, and blends of man-made and natural fibres.

In embodiments, the formulation comprises a mixture of one or more surfactant(s), one or more oil(s), one or more natural acid(s), and orange oil (an essential oil concentrate produced by cells within the rind of an orange fruit (*Citrus sinensis* fruit). Orange oil typically comprises a major proportion, for example greater than 90%, of D-limonene. More suitably, the formulation comprises (1) a base or lye solution; (2) an oil mixture comprising one or more surfactants and oils; and (3) an acid mixture.

In embodiments, the inorganic hydroxide base of the lye solution is a hydroxide base of any suitable element of the periodic table. Suitably, the inorganic hydroxide base of the lye solution is an inorganic hydroxide base of an alkali metal (Group 1 of the periodic table) such as lithium hydroxide, sodium hydroxide or potassium hydroxide; or an inorganic hydroxide base of an alkaline earth metal (Group 2 of the period table) such as magnesium hydroxide or calcium hydroxide. Suitably, the lye solution comprises potassium hydroxide.

In embodiments, the lye solution comprises a single inorganic hydroxide base, or a mixture of one or more inorganic hydroxide bases in any suitable proportion. Suitably, the lye solution comprises potassium hydroxide as a single hydroxide base.

In embodiments, the lye solution may comprise any suitable solvent. Suitably, the solvent is a polar solvent to promote solubility of the inorganic hydroxide base. Suitably the solvent comprises water. Most suitably the solvent is water, or water forms the substantial part of the solvent such that the stain removal formulation of the present invention is water-based.

In embodiments, the inorganic hydroxide base is present in the lye solution at a concentration in the range of 0.1 wt % to 50 wt %. Suitably, the inorganic hydroxide base is present in the lye solution at a concentration in the range of 1 wt % to 40 wt %. Suitably, the inorganic hydroxide base is present in the lye solution at a concentration in the range of 10 wt % to 30 wt %. Suitably, the inorganic hydroxide base is present in the lye solution at a concentration of at least 0.1 wt %, 0.5 wt %, 1 wt %, 2 wt %, 5 wt %, 10 wt %, 15 wt %, 20 wt %, 25 wt %, or 30 wt %. Suitably, the inorganic hydroxide base is present in the lye solution at a concentration of at most 50 wt %, 45 wt %, 40 wt %, 35 wt %, 30 wt %, 25 wt %, 20 wt %, 15 wt %, or 10 wt %. All weight percentages are based on the total weight of the lye solution.

In embodiments, the one or more surfactants may be water-soluble, i.e. they dissolve entirely or substantially in water. Suitable constituents of the oil mixture may be surfactants such as polyethylene glycol p-(1,1,3,3-tetramethylbutyl)-phenyl ether (commercially available as Triton X-100®) or polyethylene glycol-8 (PEG-8), oils such as orange oil (D-limonene) and a base, such as a polar amine base, for example, triethanolamine.

In embodiments, the acid mixture may comprise a water soluble inorganic or organic acid. Examples of inorganic acids include hydrochloric acid, sulfuric acid, phosphoric acid and nitric acid. Organic acids may include aqueous acetic acid solution such as white vinegar, tartaric acid, citric acid, lactic acid, or oxalic acid. Suitably the acid mixture comprises an organic acid such as acetic acid.

In embodiments the acid is present in the acid mixture at a concentration of between 1 wt % and 20 wt %. Suitably, the acid is present in the acid mixture at a concentration of between 2 wt % and 10 wt %. Suitably, the acid is present in the acid mixture at a concentration of at least 1 wt %, 2 wt %, 3 wt %, 4 wt %, 5 wt %, 6 wt %, 7 wt % m 8 wt %, 9 wt % or 10 wt %. Suitably, the acid is present in the acid mixture at a concentration of at most 20 wt %, 15 wt %, 10 wt %, or 5 wt %. All weight percentages are based on the total weight of the acid mixture.

In embodiments, the acid mixture may also comprise a thickener, such as glycerine. The thickener acts to make the formulation more viscous rending it more workable and easier to handle.

In a further embodiment, the formulation may further comprise a biocide or anti-bacterial component such as tea tree oil. Tea tree oil has been found to significantly increase the biocidal and bacterial elimination cleaning effect of the solution. The biocidal effect of tea tree oil is well know, as evidenced by Opinion on Tea Tree Oil prepared by the Scientific Committee on Consumer Products at the European Commission (SCCP/1155/08), the content of which is incorporated herein by reference.

In embodiments, the tea tree oil may be present in the formulation in amounts ranging 0.1 wt % to 30 wt %. Suitably, the tea tree oil may be present in the formulation in amounts ranging from 0.5 wt % to 20 wt %. More suitably, the tea tree oil may be present in the formulation in amounts ranging from 1 wt % to 15 wt %. Suitably, the tea tree oil may be present in the formulation in an amount of at least 0.1 wt %, 0.5 wt %, 1 wt %, 2 wt %, 3 wt %, 4 wt %, 5 wt %, 6 wt %, 7 wt %, 8 wt %, 9 wt %, 10 wt %, 12 wt %, or 15 wt %. Suitably, the tea tree oil may be present in the formulation in an amount of at most 30 wt %, 25 wt %, 20 wt %, 15 wt %, or 10 wt %. All weight percentages are based on the total weight of the formulation.

Suitably the balance of the inorganic hydroxide base and the acid is such that the formulation of an embodiment of the present invention is at, or close to being, neutral pH (i.e. pH in the range of approximately 6 to approximately 8, suitably approximately or exactly pH 7).

In embodiments the formulation comprises approximately a 1:1:1 ratio by volume of the lye solution, the oil mixture and the acid mixture on the assumption that the lye solution and the acid mixture have an appropriate concentration such that on combination a final pH of the formulation of approximately or exactly pH 7 may be achieved.

In embodiments, the oil mixture comprises a 14:1:12 ratio by volume of surfactant to oil to base. Suitably, the oil mixture comprises from a 30:1:30 to 5:1:5 ratio by volume of surfactant to oil to base. The ratio by volume of the surfactant to base may suitably vary within this range between 2:1 to 1:2, or 1.5:1 to 1:1.5.

In embodiments, the acid mixture comprises approximately a 1:1 ratio by volume of acid solution to thickener. Suitably the acid mixture may comprise from 2:1 to 1:2 ratio by volume of acid solution to thickener. Suitably the acid mixture may comprise from 1.5:1 to 1:1.5 ratio by volume of acid solution to thickener.

The mix ratios of the different components of the formulation of the present invention is customisable to allow for a weaker or stronger acting solution. Typically, the stronger the solution the better the stain removal properties but this tends to come with greater risk of damaging the material to be treated or in its impact in the environment. Suitably the acid mixture (comprising an acid and a thickener) is considered the active ingredient for stain removal and its proportion in the formulation can be adjusted to increase or decrease effectiveness, typically in reverse correlation with an increase or decrease in potential risk of damage to the material to be treated. Any increase or decrease in the proportion of the acid mixture may be balanced with an increase or decrease in the proportion and/or concentration of the lye solution to ensure pH of the formulation is maintained at or near neutral.

In embodiments, the effectiveness of the formulation of the present invention for stain removal can be adjusted by varying the proportion of water, and therefore the concentration of constituents of the formulation. Suitably, the proportion of water in the formulation can be varied by adjusting the volume of the lye solution used. Suitably the volume of the lye solution is from 10 vol % to 70 vol %. Suitably, the proportion of water in the formulation can be varied from 20 vol % to 50 vol %. Suitably, the proportion of water in the formulation may be at least 1 vol %, 2 vol %, 5 vol %, 10 vol %, 15 vol % 20 vol %, 25 vol %, 30 vol %, 35 vol %, 40 vol %, 45 vol % or 50 vol %. Suitably, the proportion of lye solution in the formulation may be at most 70 vol %, 65 vol %, 60 vol %, 55 vol %, 50 vol %, 45 vol % 40 vol %, 35 vol %, 30 vol %, 25 vol %, 20 vol %, 15 vol % or 10 vol %. All volume percentages are based on the total volume of the formulation. In embodiments the volume of the acid solution may be varied in addition to or instead of the lye solution to decrease or increase the volume percentage of the formulation. The concentration of the lye solution and/or the acid solution may be adjusted with any volume changes to ensure that the pH of the formulation remains substantially neutral (i.e. approximately pH 7).

In general, the less water present in the formulation leads to more effective stain removal and can be used for more stubborn stains and inks, such as stains over one year old, blood, rust etc. Contrarily, the less water present in the formulation leads to more gentle stain removal and can be used for underlying materials that may be more susceptible to damage, for example silk.

In a specific embodiment, the formulation comprises (1) a lye solution comprising 100 mL of a 20 wt % solution of potassium hydroxide in water, suitably deionised water, (2) an oil mixture comprising 100 mL of polyethylene glycol p-(1,1,3,3-tetramethylbutyl)-phenyl ether (Triton X-100®), 10 mL orange oil (D-limonene), 40 mL PEG-8 and 120 mL triethanolamine; and (3) an acid mixture comprising 50 mL glycerine and 40 mL white vinegar (5 wt % acetic acid in water).

In an embodiment, the formulation of the present invention may be manufactured by first preparing the base or lye solution, which is then added to the surfactants and oils before finally the acid mixture is added to complete the formulation.

In an embodiment, the mixture of surfactants and oils may be heated to a temperature in the range of approximately 50° C. to 90° C. More suitably the temperature may be in the range of approximately 60° C. to approximately 70° C., suitably approximately 60° C. The temperature should not exceed 75° C., 70° C. or most suitably should not exceed approximately 67° C. The heating may be conducted gradually, such as over a period of 60 to 120 minutes.

Once the oil mixture of surfactants and oils has reached the specified temperature, the pre-prepared base or lye solution is added. The components may then be blended for a period of time sufficient to ensure thorough mixing, for example, 30 minutes whilst maintaining the temperature of the system at or around 60° C. to 70° C. The mixture is then allowed to cool. Once the mixture has cooled to a temperature below approximately 35° C. the acid mixture is then added. The resulting mixture is then further mixed, suitably stirred, for a period of time suitable to ensure complete reaction of the components. Suitably, the mixture is mixed for up to about 5 hours. Suitable stirring may be via a magnetic stirrer. The amount and proportions of base, acid and thickener may be varied to alter the strength and effectiveness of the formula.

In use the formulation is applied directly to the surface of the material comprising the ink or stain. Sufficient formulation should be applied to wet the material. Exact quantities vary depending on the material, in particular the absorbency of the material, and the nature of the stain or ink being removed. A typical procedure involves wetting the material sufficiently to solubilise the ink or stain, and then dabbing the solubilised ink or stain with an absorbent material such as a cloth or tissue to remove the solubilised ink or stain. If any remnants of the ink or stain remain, repeat application of the formulation may be required in some cases. Alternatively, application of the formulation to solubilise the ink or stain may be followed by washing the fabric using conventional clothes washing powder or liquid.

It has also been found that the acetic acid component becomes more active when applied in reduced temperatures. In its pure form acetic acid will become a solid at about 4° C. or lower. While at this point it is highly effective as a stain remover it is also extremely caustic and hazardous. The formulation of the present invention allows the active ingredients to become more effective at lower temperatures (i.e. temperatures below room temperature (20 to 25° C.) without any of the negative effects associated with use of pure or glacial acetic acid.

The formulation of the present invention may be used to remove any suitable stain or ink. Permanent and non-permanent inks may be removed, for example, inks from commonly used, commercially available pens, such as Bic® roller ball pens and Sharpie® permanent marker pens. Tests have also shown the present invention to be effective at removing stains such as grass, beetroot, curry, lipstick and blood stains.

The formulation can be delivered or applied to the stain by means of an applicator, such as a pen type applicator, for example a roller ball pen type applicator. The applicator is also an aspect of the present invention.

In an embodiment of the applicator of the present invention, the device is a pen. In another embodiment, the applicator may be refillable. Suitably, the applicator may comprise a roller ball. Suitably the roller ball is made of glass as opposed to a traditional metal ball to avoid any risk of corrosion or rusting. The roller ball guide can be made of any suitable material sufficient to withstand the force exerted on it during the dabbing motion required to apply the formula to the affected area. The pen type apparatus is dabbed/rolled over the affected area to wet the stained material before removal of the ink or stain by dapping or wiping as described above. Alternatively, the applicator may comprise foam or material pads, sprays or other forms of application that does not alter or damage the material to which it is applied.

Although the formulation of the invention comprises an oil mixture, the formulation has shown to break down completely in water. This increases the environmental benefits of the formulation as it is biodegradable, as opposed to solvent based systems. The effectiveness of the formulation also means a reduction in the use of ineffective non-solvent based systems.

Industry-standard flammability tests (for example CS/FAA 25.853, ASTM F1 104-02, F2109-01 and F484-08) conducted on material previously treated with the formulation of the present invention show that it passes. Without wishing to be bound by theory, it is assumed that as the formulation is water-based, or at least not based on volatile solvents, there is no, or minimal, flammable residue left on the material after treatment. The formulation of the present invention is therefore suitable for use on aviation materials. It is assumed that once compliance data has been established, use of the formulation on aviation materials may be carried out without any requirement for re-testing for flammability.

It should be understood that the different embodiments of the invention described herein can be combined where appropriate and that features of the embodiments of the invention can be used interchangeably with other embodiments where appropriate.

The formulation according to the invention effectively removes ink and other stains from a wide range of materials as is demonstrated by the following non-limiting examples.

Example 1—Preparation of the Formulation According to an Embodiment of the Present Invention To prepare the Lye solution; 20 g of potassium hydroxide is added to 100 mL of deionised water, the mixture is stirred until dispersed.

The mixture of water soluble surfactants and oils is then prepared by adding 100 mL of polyethylene glycol p-(1,1,3,3-tetramethylbutyl)-phenyl ether (Triton X-100®), 10 mL orange oil (D-limonene), 40 mL polyethylene glycol-8 (PEG-8) and 120 mL triethanolamine to a stainless steel container, before the mixture is heated slowly over a period of approximately 60 mins to approximately 60° C., a maximum of 67° C. Once at the desired temperature, the previously prepared Lye solution is added to the prepared mixture of water soluble surfactants and oils. The resulting mixture is then stirred for between 30 minutes and 45 minutes. The mixture is then allowed to cool to 35° C. or below. At this point 50 mL glycerine and 40 mL white vinegar (5 wt % acetic acid in deionised water) is added to the mixture and the resulting mixture agitated until the solution turns cloudy. The mixture is then stirred at from 850 to 1000 rpm for 5 hours. The stirring of the mixture is controlled to minimise air bubbles.

A stronger (i.e. enhanced stain removal) formula was prepared by the same method by use of a lye solution comprising 40 g of potassium hydroxide in 100 mL of deionised water and adjusting the amounts of the acid mixture to 100 mL of glycerine and 40 mL white vinegar (5 wt % acetic acid in deionised water).

Example 2

A low or high water content variant of the above formula can be prepared by adjusting the amount of lye solution to between 10 vol % to 70 vol % of the total volume of the formula. The concentration of the lye solution is varied such that the pH of the formula is maintained at approximately neutral (pH 7).

Example 3

An example of a formula comprising tea tree oil is prepared by the above method and including the addition of 0.5 wt % to 10 wt % tea tree oil at any stage and to any component of the method, for example, the tea tree oil can be added to the formula at the end of the above method.

Example 4

The formulation of the present invention was compared with commercially available stain removal formulations. Comparative formulations were (1) Perfect Pen® stain remover; (3) Dr Beckhams® Stain Devils® Ink and Pen remover; (4) A lipstick style ink remover by Tenluxe Co Ltd (5) Professional Leather Limited® Ink and Stain Remover. The formulation of the present invention is present as example (2).

These known stain removers are purportedly effective against marks from pens (Sharpie®, Bic®, fountain etc.), oils (including cooking oils), spices, grass, blood and lipstick. The known stain remover's effectiveness varies depending on the material to which it was applied.

As can be seen in FIGS. 6a to 6e five samples of E-Leather® commercially available from the E-leather Group® were each marked similarly with ink from a Bic® roller ball blue pen and the ink left to dry.

Figures 7A, 7B:
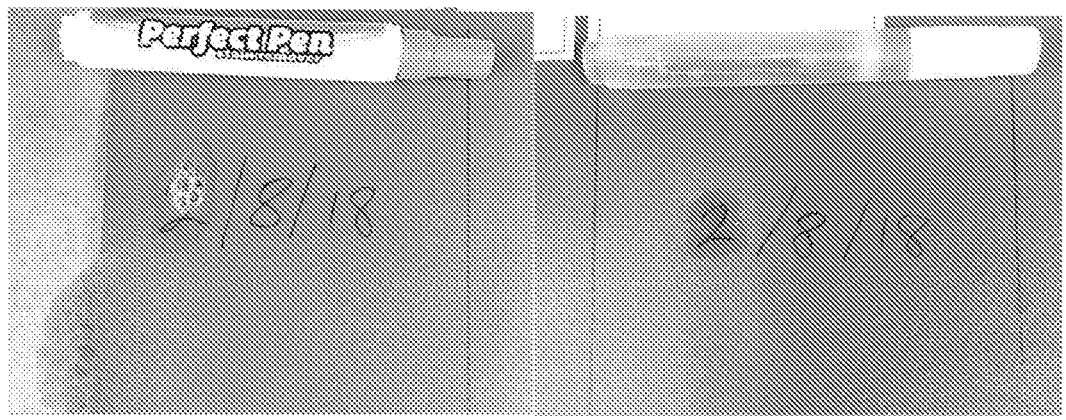
FIGS. 7a to 7e shows the samples shown in FIGS. 6a to 6e undergoing stain removal treatments with a range of prior art stain removal formulations (in accordance with the manufacturer's instructions) and the formulation of the present invention applied in accordance with the method of the present invention.
Figures 7C, 7D:
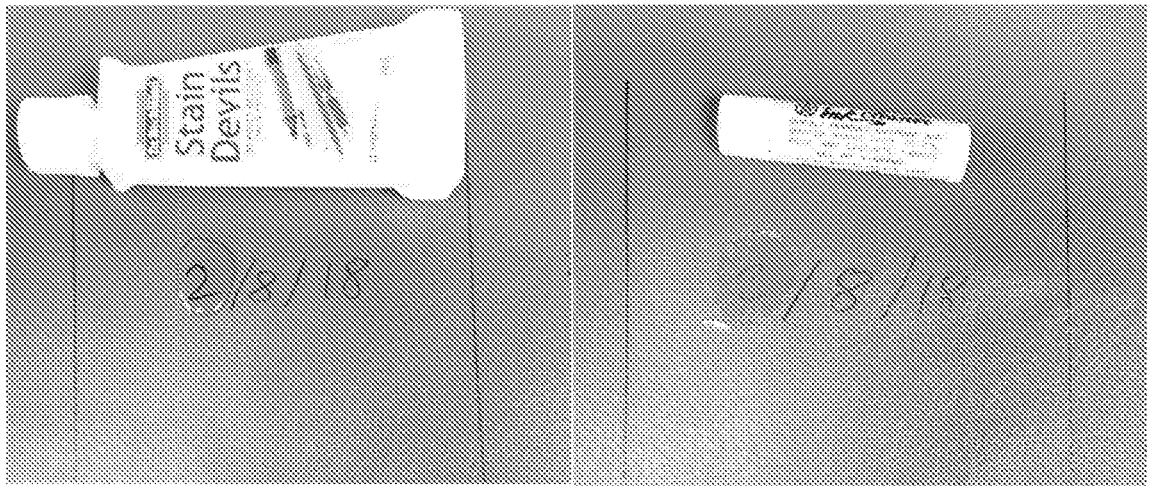
Figure 7E:
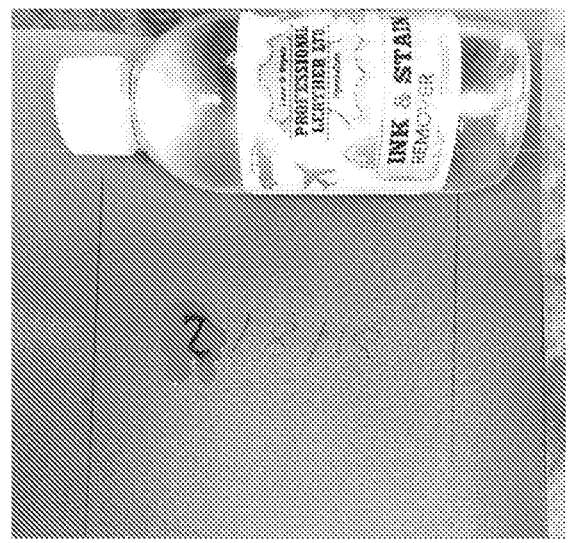

As shown in FIGS. 7a to 7b, a separate marked sample was then treated in accordance with the manufacturer's instructions with one of the comparative formulations (Samples 1 and 3 to 5 respectively) and a formulation in accordance with the present invention (Sample 2), prepared as in Example 1. The formulation of the present invention was applied to wet the fabric and allowed to soak in for a period of 60 minutes prior to being dabbed with an absorbent material to remove the solubilised ink. In the formulation of the present invention no re-application of the formulation was required.

Figure 8A:
FIGS. 8a to 8e shows the samples shown in FIGS. 6a to 7e after stain removal treatments are complete.
Figure 8B:
Figure 8C:
Figure 8D:
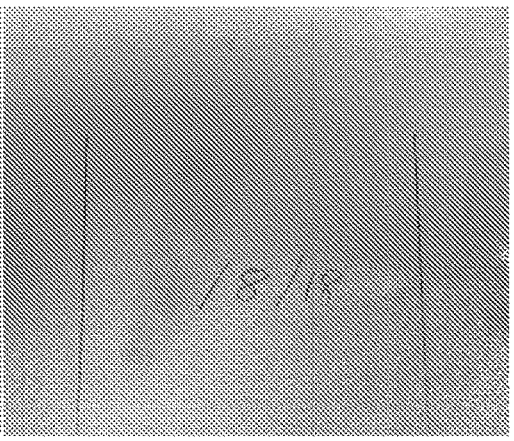
Figure 8E:
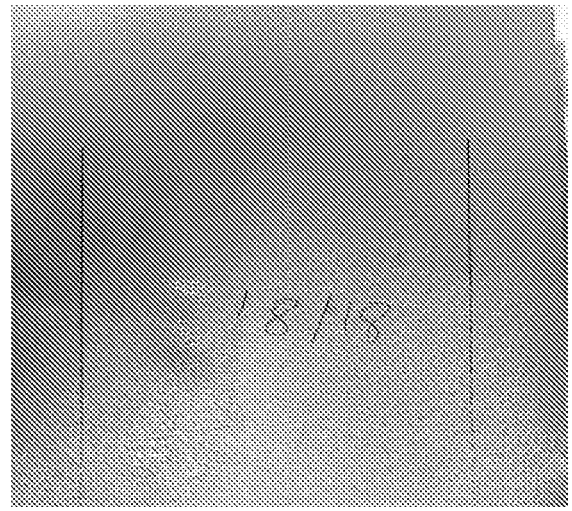

FIGS. 8a to 8b show the results of the various treatments. It is clear that the formulation of the present invention (Sample 2; FIG. 8b) removed the ink stain from the material. FIGS. 8a, 8c and 8d show ink stain remaining after one application for Samples 1, 3 and 4. Sample 5, as shown in FIG. 8e removed the stain but there was clear evidence of damage to the surface of the material leading to warping.

Figure 9:
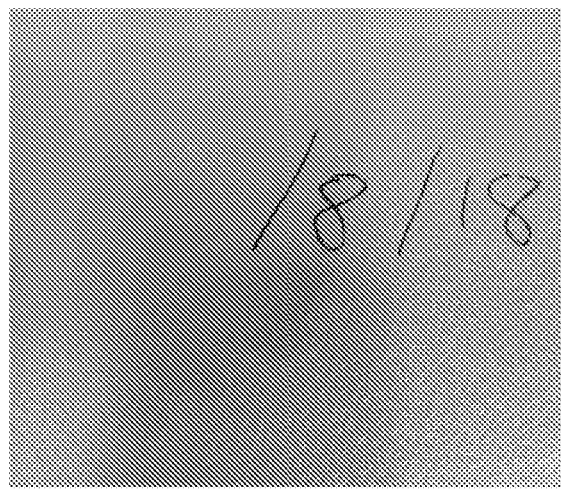
FIG. 9 shows an enlarged view of the treatment area on the sample shown in FIGS. 6a to 8e which has been treated with the formulation in accordance with the present invention.

As shown most clearly in FIG. 9, the formulation of the present invention effectively removed the ink without any visible damage to the underlying material.

Example 5

The formulation of the present invention prepared according to the method of Example 1 has been evaluated in various tests to ensure compliance with the current aviation requirements.

One such example is the vertical burn test to determine whether specimens meet the requirements of CS/FAA 25.853 and Appendix F Part I(a)(1)(ii)—Test Criteria for Showing Compliance to CS 25.853. The test specimens (i. Leather—Ambassador Dove; Wollsdorf p/n 04500071; colour code 15098; ii. Leather—Ingleston Dark Blue; Muirhead p/n DF694; iii Leather—Ingleston FR White; Muirhead p/n DF692; iv. Leather—Lord Brown; Foglizzo p/n LD011) were conditioned for 24 hours prior to testing. They were then exposed at a distance of 19 mm above a flame of 38 mm in height at a temperature of approx. 843° C. (as measured by a calibrated thermocouple) for 12 seconds. No flaming times or flaming times of drippings were recorded. The burn lengths observed ranged from 2.0 cm to 2.8 cm (0.80 to 1.1 ins) over the four samples.

The term 'burn length' being defined as the distance from the original edge to the farthest evidence of damage to the test specimen due to flame impingement, including areas of partial or complete consumption, charring, or embrittlement, but nor including areas sooted, stained, warped, or discoloured, nor areas where material has shrunk or melted away from the heat source. All samples passed the flammability test and were provided with test certificate nos. W60000093 to W60000096 respectively.

The formulation of the present invention (2 litres) is held in cold (4° C.) storage for 17 days, a portion of same the formulation of the present invention (2 litres) is also held in warm (20° C.) storage for the same length of time, and no discolouration was noted. This test asserts the formulations compliance with ASTM F1 104-02.

The formulation of the present invention was applied to leather samples as required and left to dry at room temperature for at least 18 hours. After this time no evidence of discolouration or degrading of material was noted. The grey scale ratings remained at 5. This test shows the above claimed formula complies with F2109-01.

All samples were conditioned to specified parameters for 24 hours prior to testing. The sample is then placed under stress on a cantilever for 10 minutes. A cotton/flannel swatch is loaded to the sample and then soaked with the formula. A selected range of times from 30 minutes to 8 hours were used and at each interval the sample was inspected using concentrated collimated light for crazing, cracking or etching. No evidence was found after the specified time, the formula therefore complies with F484-08.

Samples were immersed in the formulation of the present invention for 3 to 5 minutes and ensuring that at least 50% of the samples were covered. The samples are then removed from the formula and placed in a convection oven at a 65.5° C. for 30 minutes. The samples are cooled to room temperature and rinsed with tap water for 1 minute. Following this they are rinsed with deionized water/distilled water for 15 seconds and allowed to air dry for 30 minutes. There was no evidence of permanent streaking or staining to the samples, asserting their compliance with F484-08.

The above examples demonstrate the ability of the formulation of the present invention to effectively remove stains with no or minimal damage to the underlying fabric. Further evidence is provided that fabrics treated with the formulation of the present invention comply with flammability requirements for use in aircraft.

Although particular embodiments of the invention have been disclosed herein in detail, this has been done by way of example and for the purposes of illustration only. The aforementioned embodiments are not intended to be limiting with respect to the scope of the invention. It is contemplated by the inventors that various substitutions, alterations, and modifications may be made to the invention without departing from the scope of the invention.

The invention claimed is:

1. A water-based stain removal formulation, comprising: a lye solution comprising an inorganic hydroxide base; an oil mixture comprising one or more surfactants, an orange extract, an organic base, and tea tree oil; and an acid mixture comprising acetic acid and a thickener.

2. The formulation of claim 1, wherein the lye solution comprises potassium hydroxide in water.

3. The formulation of claim 2, wherein the lye solution comprises 20 wt % potassium hydroxide in water, based on the total weight of the lye solution.

4. The formulation of claim 1, wherein the oil mixture comprises at least one of polyethylene glycol p-(1,1,3,3-tetramethylbutyl)-phenyl ether, orange extract comprising greater than 90 wt % D-limonene, polyethylene glycol-8 (PEG-8) and triethanolamine.

5. The formulation of claim 1, wherein the acid mixture comprises at least one of glycerine and white vinegar.

6. The formulation of claim 1, wherein the lye solution comprises between 10 vol % and 70 vol % of the formulation, based on the total volume of the formulation.

7. The formulation of claim 1, wherein the tea tree oil is present in the range of from 1 wt % to 15 wt %, based on the total weight of the formulation.

8. The formulation of claim 1, wherein the pH of the formulation is approximately pH 7.

9. The formulation of claim 1, wherein the formulation is biodegradable.

10. A method of preparing a water-based stain removal formulation, the method comprising the following steps:
provide a lye solution comprising an inorganic hydroxide base;
provide an oil mixture comprising one or more surfactants, an orange extract, an organic base, and tea tree oil;
heat the oil mixture to a temperature in the range of from approximately 60° C. to approximately 70° C. to provide a heated oil mixture;
combine the lye solution with the heated oil mixture to provide a combined mixture;
blend the combined mixture for a period of time in the range of from approximately 15 minutes to approximately 1 hour whilst maintaining the combined mixture at a temperature in the range of from approximately 60° C. to approximately 70° C. to provide a heated combined mixture;
allow the heated combined mixture to cool to approximately 35° C. to provide a cooled combined mixture;
combine an acid mixture comprising acetic acid and a thickener with the cooled combined mixture to provide a combined neutral mixture having a pH of approximately pH 7; and
stir the combined neutral mixture for a period of time in the range of from approximately 3 to approximately 8 hours to provide the formulation.

11. The method of claim 10, wherein the lye solution comprises potassium hydroxide in water.

12. The method of claim 11, wherein the lye solution comprises 20 wt % potassium hydroxide in water, based on the total weight of the lye solution.

13. The method of claim 10, wherein the oil mixture comprises at least one of polyethylene glycol p-(1,1,3,3-tetramethylbutyl)-phenyl ether, orange extract comprising greater than 90 wt % D-limonene, polyethylene glycol-8 (PEG-8) and triethanolamine.

14. The method of claim 10, wherein the acid mixture comprises at least one of glycerine and white vinegar.

15. The method of claim 10, wherein the lye solution comprises between 10 vol % and 70 vol % of the formulation, based on the total volume of the formulation.

16. The method of claim 10, wherein the tea tree oil is added in the range of from 1 wt % to 15 wt %, based on the total weight of the formulation.

17. A method of removing a stain using the formulation of claim 1, the method comprising the following steps:
apply the formulation to a stain on a fabric such that the stained area is wetted;
optionally allow a period of time of from approximately one minute to approximately one hour to pass;
contact the stained area of the fabric with an absorbent material to withdraw and retain the solubilised stain on the absorbent material;
repeat as necessary.

* * * * *